United States Patent
Hsu et al.

(10) Patent No.: US 11,284,220 B2
(45) Date of Patent: Mar. 22, 2022

(54) APPLICATION SERVICE SERVER, REGION-BASED INFORMATION PROCESSING METHOD, AND USER EQUIPMENT

(71) Applicant: Industrial Technology Research Institute, Hsinchu (TW)

(72) Inventors: Kuo-Huang Hsu, Taoyuan (TW); Chi-Yu Li, Hsinchu County (TW); Tzu-Hsiang Su, Taichung (TW); Yu-Dai Yan, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 63 days.

(21) Appl. No.: 16/892,296

(22) Filed: Jun. 4, 2020

(65) Prior Publication Data
US 2021/0329413 A1    Oct. 21, 2021

(30) Foreign Application Priority Data

Apr. 15, 2020  (TW) .................... 109112664

(51) Int. Cl.
*H04W 4/02*     (2018.01)
*H04W 4/029*    (2018.01)
(Continued)

(52) U.S. Cl.
CPC ............ *H04W 4/029* (2018.02); *G06F 16/29* (2019.01); *H04L 51/24* (2013.01); *H04L 67/18* (2013.01);
(Continued)

(58) Field of Classification Search
CPC ..... H04W 4/029; H04W 4/021; H04W 4/025; H04W 64/00; H04W 64/003;
(Continued)

(56) References Cited

U.S. PATENT DOCUMENTS

| 7,659,848 B2 | 2/2010 | Dooley et al. |
| 8,265,987 B2 | 9/2012 | Goto |

(Continued)

FOREIGN PATENT DOCUMENTS

| CN | 109996187 | 7/2019 |
| CN | 110942652 | 3/2020 |

(Continued)

OTHER PUBLICATIONS

A. Napolitano et al., "Implementation of a MEC-based Vulnerable Road User Warning System," 2019 AEIT International Conference of Electrical and Electronic Technologies for Automotive (AEIT Automotive), Jul. 2-4, 2019, pp. 1-6.

(Continued)

*Primary Examiner* — Fred A Casca
(74) *Attorney, Agent, or Firm* — JCIPRNET

(57) ABSTRACT

An application service server, a region-based information processing method, and user equipment are provided. In the method, an initial message is received, identification information is determined according to the location information of the initial message, and a preprocessed message is generated. The initial message includes a notification content corresponding to the location information, and the location information is defined by a geographic coordinate system. The identification information is provided by a geographic information service. The preprocessed message includes the notification content and the identification information.

34 Claims, 8 Drawing Sheets

(51) Int. Cl.
*G06F 16/29* (2019.01)
*H04L 51/224* (2022.01)
*H04L 67/52* (2022.01)
*H04L 67/55* (2022.01)
*H04L 67/306* (2022.01)
*H04W 4/021* (2018.01)

(52) U.S. Cl.
CPC ............ *H04L 67/26* (2013.01); *H04L 67/306* (2013.01); *H04W 4/021* (2013.01)

(58) Field of Classification Search
CPC .......... H04W 64/006; H04W 12/00503; H04L 67/26; H04L 67/306; H04L 67/18; H04L 51/24; G06F 16/29; H04B 17/27; H04B 7/086

See application file for complete search history.

(56) References Cited

U.S. PATENT DOCUMENTS

| | | | |
|---|---|---|---|
| 9,384,491 B1 | 7/2016 | Briggs et al. | |
| 10,453,001 B2 | 10/2019 | Sunshine et al. | |
| 2012/0262289 A1* | 10/2012 | French, II | G08B 25/009 340/539.11 |
| 2016/0127871 A1* | 5/2016 | Smith | G01C 17/02 455/456.6 |
| 2018/0156624 A1 | 6/2018 | Bai et al. | |
| 2018/0306600 A1 | 10/2018 | Nicolaas et al. | |
| 2018/0345961 A1 | 12/2018 | Saigusa et al. | |
| 2019/0302220 A1 | 10/2019 | Kumar et al. | |

FOREIGN PATENT DOCUMENTS

| | | |
|---|---|---|
| TW | M445233 | 1/2013 |
| TW | 201901628 | 1/2019 |
| TW | M578665 | 6/2019 |
| WO | 2009081817 | 7/2009 |
| WO | 2017196152 | 11/2017 |

OTHER PUBLICATIONS

R. Bastani Zadeh et al., "Three-Phases Smartphone-Based Warning System to Protect Vulnerable Road Users Under Fuzzy Conditions," IEEE Transactions on Intelligent Transportation Systems, vol. 19, No. 7, Jul. 2018, pp. 2086-2098.

E. Alemneh et al., "PV-Alert: A fog-based architecture for safeguarding vulnerable road users," 2017 Global Information Infrastructure and Networking Symposium (GIIS), Oct. 25-27, 2017, pp. 9-15.

A. Hussein et al., "P2V and V2P communication for Pedestrian warning on the basis of Autonomous Vehicles," 2016 IEEE 19th International Conference on Intelligent Transportation Systems (ITSC), Nov. 1-4, 2016, pp. 2034-2039.

M. Bagheri et al., "Cellular-based vehicle to pedestrian (V2P) adaptive communication for collision avoidance," 2014 International Conference on Connected Vehicles and Expo (ICCVE), Nov. 3-7, 2014, pp. 450-456.

* cited by examiner

APPLICATION SERVICE SERVER, REGION-BASED INFORMATION PROCESSING METHOD, AND USER EQUIPMENT

CROSS-REFERENCE TO RELATED APPLICATION

This application claims the priority benefit of Taiwan application serial no. 109112664, filed on Apr. 15, 2020. The entirety of the above-mentioned patent application is hereby incorporated by reference herein and made a part of this specification.

TECHNICAL FIELD

The disclosure relates to an application service server, a region-based information processing method, and user equipment.

BACKGROUND

The $3^{rd}$ Generation Partnership Project (3GPP) standard has defined cellular vehicle-to-everything (C-V2X) technologies since Release 14. Main technologies of C-V2X come in two categories: one is to allow direct communication between apparatuses through a PC5 interface (in a PC5 infrastructure), and the other is to transmit messages through a Uu interface using a base station (in an evolved Multimedia Broadcast Multicast Service (eMBMS) infrastructure).

In the method of transmitting through a Uu interface, information is generally transmitted back to an application server through a vehicle, a road side unit (RSU) and various mobile devices. After being processed by the application server, the information is unicast or broadcast by the base station to a mobile terminal device of a road user in a service range.

In the conventional art, most V2X-based services release information by broadcasting. While processing messages, a V2X mobile terminal device (such as an on-board unit (OBU), or a pedestrian handheld device) of the road user generally cannot determine a subsequent application until confirming relative locations between surrounding objects, events, and the road user himself based on a coordinate location of the Global Positioning System (GPS). However, a service range of a base station of a cellular application may vary from one kilometer to tens of kilometers, and the V2X mobile terminal device needs to process all information within the service range. Eventually, excessive information is obtained by the terminal device through a network. In a case that a geographic location is calculated for each message, many unnecessary computing operations are performed, consuming a considerable quantity of computing resources.

In addition, when the mobile terminal device is an in-vehicle device, the processing of a large amount of information as in the related art will occupy a lot of computing resources, affecting the response time of the application or even leading to a result that the application cannot respond in time. When the mobile terminal device is a device of a vulnerable road user (VRU), the battery state design needs to be considered in addition to the computing support, and different from an in-vehicle device, the mobile terminal device normally is not able to repeatedly compute useless information for a long time. For example, while a vehicle is moving forward, in a conventional operation mode, real-time statuses of all vehicles behind the vehicle, road event information (such as road construction) and other information need to be processed and computed. However, all such rear-related information may be irrelevant to a subsequent travel route of the vehicle.

SUMMARY

The present disclosure provides an application service server, a region-based information processing method, and user equipment.

The region-based information processing method according to an embodiment of the present disclosure includes the following steps: receiving an initial message, determining identification information according to location information, and generating a preprocessed message. The initial message includes a notification content corresponding to the location information, and the location information is defined by a geographic coordinate system. The identification information is provided by a geographic information service. The preprocessed message includes the identification information and the notification content.

The application service server according to an embodiment of the present disclosure includes (but is not limited to) a communications transceiver and a processor. The communications transceiver is configured to transmit or receive a signal. The processor is coupled to the communications transceiver and configured to: receive an initial message through the communications transceiver, determine identification information according to location information, and generate a preprocessed message. The initial message includes a notification content corresponding to the location information, and the location information is defined by a geographic coordinate system. The identification information is provided by a geographic information service. The preprocessed message includes the identification information and the notification content.

A user equipment according to an embodiment of the present disclosure includes (but is not limited to) a communications transceiver and a processor. The communications transceiver is configured to transmit or receive a signal. The processor is coupled to the communications transceiver and configured to: receive a preprocessed message through the communications transceiver, and process a notification content according to a comparison result between identification information and second identification information. The preprocessed message includes the identification information and the notification content, and the identification information is provided by a geographic information service and used to represent location information defined by a geographic coordinate system. The second identification information is provided by the geographic information service and used to represent a region of interest to the user equipment.

Several exemplary embodiments accompanied with figures are described in detail below to further describe the disclosure in details.

DETAILED DESCRIPTION OF DISCLOSED EMBODIMENTS

Figure 1:
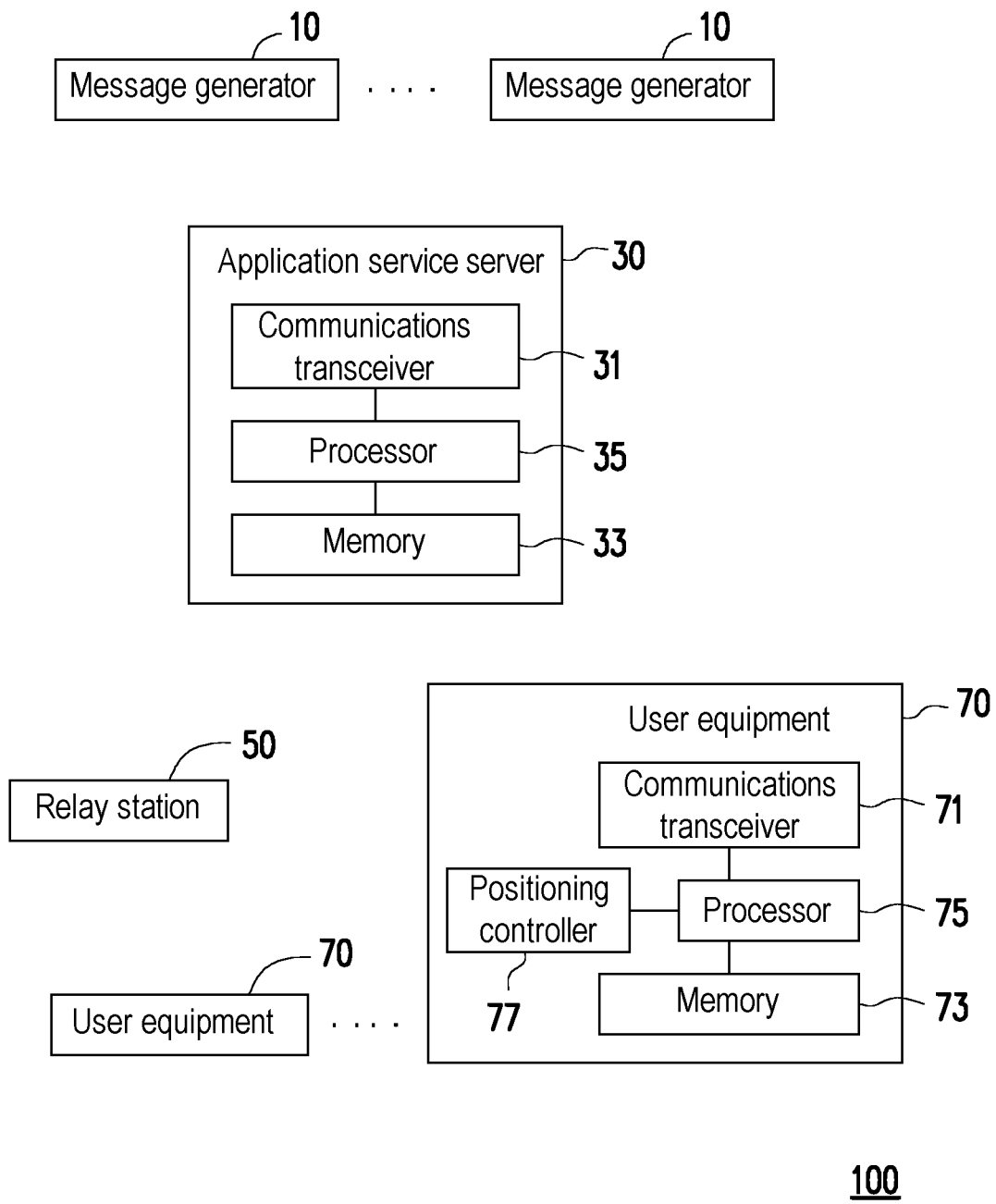
FIG. 1 is a block diagram of components of a communications system according to an embodiment of the present disclosure.

FIG. 1 is a block diagram of components of a communications system 100 according to an embodiment of the present disclosure. Referring to FIG. 1, the communications system 100 includes (but is not limited to) one or more message generators 10, an application service server 30, one or more relay stations 50, and one or more pieces of user equipment 70.

The message generator 10 may be a mobile device (such as a smart phone, a tablet computer, or a smart watch), an on-board unit (OBU), a road side unit (RSU), or one of various sensors (such as sensors of a sign, an image, temperature, humidity, brightness, or the like).

The application service server 30 may be a desktop computer, one of various servers, a workstation, a background host, or another apparatus. The application service server 30 includes (but is not limited to) a communications transceiver 31, a memory 33, and a processor 35.

For example, the communications transceiver 31 is a transceiver supporting a wired network such as the Ethernet, an optical network or a cable (possibly including, but without limitation, components such as a connection interface, a signal converter, and a communications protocol processing chip), or a transceiver supporting a wireless network such as a WiFi, third-generation (3G), fourth-generation (4G) or later-generation mobile network (possibly including, but without limitation, components such as an antenna, a digital-to-analog/analog-to-digital converter, and a communications protocol processing chip).

The memory 33 may be any form of fixed or removable random access memory (RAM), read-only memory (ROM), flash memory or a similar component, or a combination thereof.

The processor 35 is configured to process digital signals and execute a program according to an exemplary embodiment of the present disclosure. Functions of the processor 35 may be implemented by a programmable unit such as a central processing unit (CPU), a microprocessor, a microcontroller, a digital signal processing (DSP) chip, and a field programmable logic gate array (FPGA). In some embodiments, the functions of the processor 35 may also be implemented by an independent electronic apparatus or an integrated circuit (IC), and operations of the processor 35 may also be implemented by software.

The relay station 50 may be a home evolved NodeB (HeNB), an eNB, a next-generation NodeB (gNB), a base transceiver system (BTS), an RSU, or a repeater.

The user equipment 70 may be an apparatus such as a smart phone, a tablet computer, a smart watch, a notebook computer, or an OBU. The user equipment 70 includes (but is not limited to) a communications transceiver 71, a memory 73, a processor 75, and a positioning controller 77.

For implementations of the communications transceiver 71, the memory 73, and the processor 75, reference may be made to the descriptions of the communications transceiver 31, the memory 33, and the processor 35, and the details are omitted here.

The positioning controller 77 may be a positioning device that supports any type of global navigation satellite system (GNSS), or a receiver or transceiver based on various wireless communications technologies such as a mobile network technology, a WiFi technology, a Bluetooth technology, an infrared technology, an RFID technology, a ZigBee technology, an ultra-wide band (UWB) technology, or an ultrasonic wave technology (that is, the positioning controller 77 may also be a communications transceiver 71), and may transmit or receive a wireless signal actively or passively accordingly. The wireless signal may be used to determine a location of the user equipment 70 to which the positioning controller 77 belongs.

In an embodiment, the application service server 30 and the user equipment 70 transmit or receive data through the relay station 50. For example, data is transmitted through a Uu interface or a PC5 interface in a V2X technology. In some embodiments, the application service server 30 may directly communicate with the user equipment 70.

For ease of understanding an operation process in an embodiment of the present disclosure, several embodiments will be given below to describe in detail an operation process of each apparatus in a communications system 100 according to an embodiment of the present disclosure.

Figure 2:
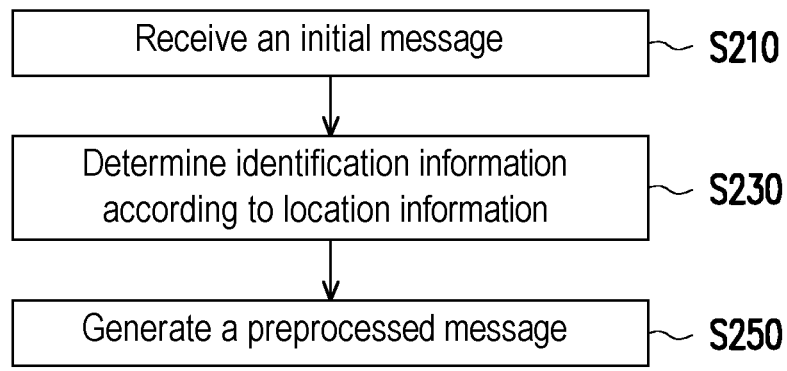
FIG. 2 is a flowchart of a region-based information processing method according to an embodiment of the present disclosure.

With respect to operations of the application service server 30, FIG. 2 is a flowchart of a region-based information processing method according to an embodiment of the present disclosure. Referring to FIG. 2, the processor 35 of the application service server 30 receives an initial message from the message generator 10 through the communications transceiver 31 (step S210). Specifically, the initial message may include notification content corresponding to location information of the message generator 10. The location information is a longitude coordinate, a latitude coordinate, and/or an altitude coordinate, or a two-degree transverse Mercator coordinate, and is used to represent a location of the message generator 10 or a region in which the message generator 10 is located. The notification content may be associated with traffic signs, road signs, road condition information, road events, vehicle real-time status, pedestrian status, weather information, sensing information, or various danger or warning information, and is not limited in the embodiments of the present disclosure. In other words, the initial message is a notification message released by the message generator 10 to other apparatuses to indicate its location or region.

The processor 35 may determine identification information according to location information (step S230). Specifically, the identification information is provided by a geographic information service (for example, Open Street Map (OSM), an electronic map, or various geographic information systems (GIS)). The geographic information service is a service that integrates geographic information (for example, roads, administrative regions, weather sensing results, and industrial forms) with map information (for example, region or location). The processor 35 may use the identification information to distinguish several reference objects in different locations or regions (for example, administrative regions, roads, buildings, rivers, sidewalks, water pipes, communications networks, or electric wires). For example, the identification information is a road number, a wire pole number, or a distribution box number.

In an embodiment, the identification information is a cartographic data attribute defined by a geographic information service. Depending on different design requirements, the cartographic data attribute may vary with different cartographic data types (for example, roads, buildings, rivers, sidewalks, water pipes, communications networks, or electrical wires). The cartographic data attribute may include an identifier and corresponding representative location information. The identifier may be a word, or a numeral, or a symbol, or a combination thereof, and may also be known as a serial number, a sequence number, or a code. For example, an identifier of China Road First Section is 123, and an identifier of China Road Second Section is 124. The representative location information is associated with a geographic coordinate system. The representative location information is a serial number, sequence number, or code used to represent the location information (that is, converted into another geocoding format), but may also be the same or similar coordinates. Each reference object has a corresponding identifier and corresponding representative location information. That is, the identifier may be used to find a specific reference object, and the representative location information may be used to find a location of the reference object or a region in which the reference object is located.

Figure 3:
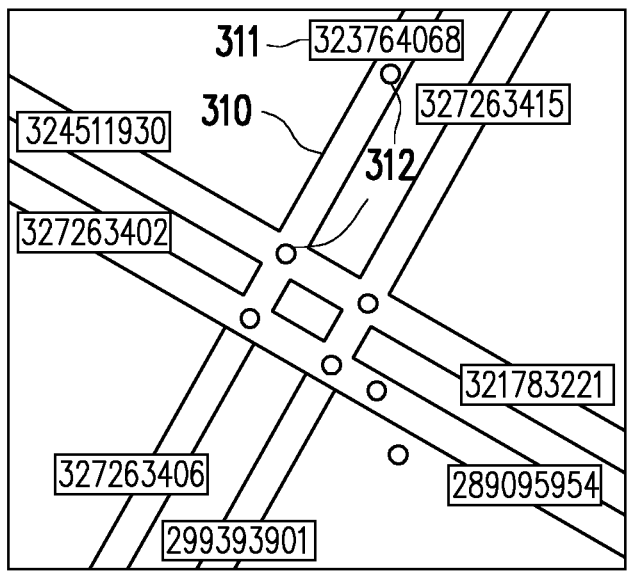
FIG. 3 is an example illustrating road-related identification information.

For example, FIG. 3 is an example illustrating road-related identification information. Referring to FIG. 3, the identification information 311 of the road 310 is an identifier of 323764068. The road 310 is formed by two nodes 312, and the road of the same name may form a node 312 due to changes in road length, turning, and bending. Different identifiers are assigned by the geographic information service to roads located in different up, down, left, and right directions at an intersection in the figure. As can be seen, the identification information 311 may be used to distinguish roads in different sections and different directions.

Content of the cartographic data attribute may exist in different forms and/or have different items depending on the cartographic data type or the geographic information service. For example, with respect to road types, the cartographic data attribute may further include road forms (for example, one-way or two-way road), the number of lanes (for confirming road width), and the like. In another embodiment, the identification information may also include one of the identifier or the representative location information. In some embodiments, the identification information may also be data attributes representing different locations or regions, for example, sensing statistics results of a specific region.

In an embodiment, the processor 35 may load map information provided by the geographic information service. For example, the processor 35 obtains map information by downloading, reading, or the like. This map information is associated with cartographic data attributes or other data attributes of the reference objects. Each cartographic data attribute or data attribute may include second location information. The second location information is coordinates defined by the geographic coordinate system (for example, latitude and longitude coordinates, or two-degree transverse Mercator coordinates). That is, each cartographic data attribute or data attribute is cartographic data or other data of the location or region corresponding to the second location information. The processor 35 may convert the second location information of the reference objects into corresponding representative location information separately. Each piece of representative location information is in an index form. Different representative location information in the index form may be a sequence number or serial number arranged according to a specific rule or correspondence, so as to facilitate retrieval of corresponding coordinates based on this index. Compared with the location information in the form of latitude and longitude coordinates, the index or identifier form may improve retrieval efficiency.

In other embodiments, the geographic information service may directly provide the representative location information of each reference object in the index form, without requiring the processor 35 to perform conversion between coordinates and the index.

Each reference object has corresponding identification information that may be used as a basis for distinguishing between different reference objects and identifying the location of each reference object or the region in which the reference object is located. Therefore, after the location information is sorted into a specific reference object, the identification information may be used to understand the location or region corresponding to the initial message.

Figure 4:
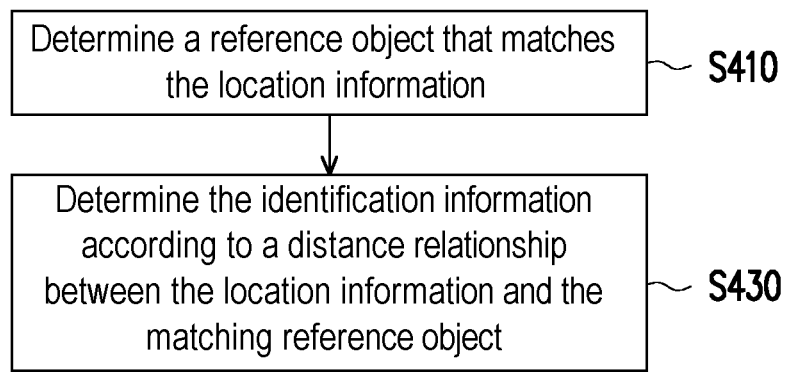
FIG. 4 is a flowchart of a method for determining identification information according to an embodiment of the present disclosure.

FIG. 4 is a flowchart of a method for determining identification information according to an embodiment of the present disclosure. Referring to FIG. 4, the processor 35 may determine one or more reference objects that match the location information (step S410). Locations of the matching reference objects are closer to the location corresponding to the location information than other reference objects.

Figure 5:
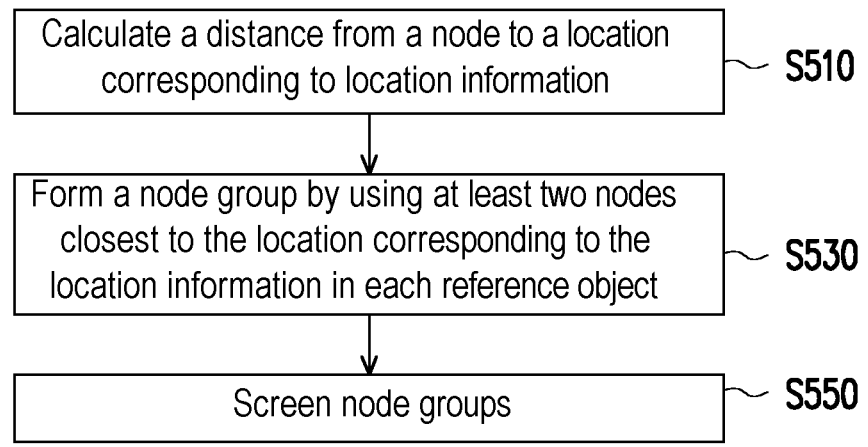
FIG. 5 is a flowchart of a method for determining a matching reference object according to an embodiment of the present disclosure.

FIG. 5 is a flowchart of a method for determining a matching reference object according to an embodiment of the present disclosure. Referring to FIG. 5, it is assumed that each reference object is formed by one or more nodes, that is, each node is located at the location of a corresponding reference object or the region in which the reference object is located. The locations of the nodes may be provided by the geographic information service, or may be established by the processor 35 based on a specific rule or correspondence after obtaining map information. The processor 35 may calculate a distance from each node to the location corresponding to the location information (step S510), that is, calculate the distance between the location corresponding to the location information and the location of each node.

The processor 35 may form a node group by using at least two nodes closest to the location corresponding to the location information in each reference object (step S530). In this embodiment, at least two nodes are included in a range of each reference object. Each node group includes at least two nodes among all nodes in the corresponding range. That is, each node group may represent at least a part of the range that covers the reference object. The processor 35 may select two or more closest nodes for each reference object based on the distance that corresponds to the node in each reference object and that is obtained in step S510.

Figure 6:
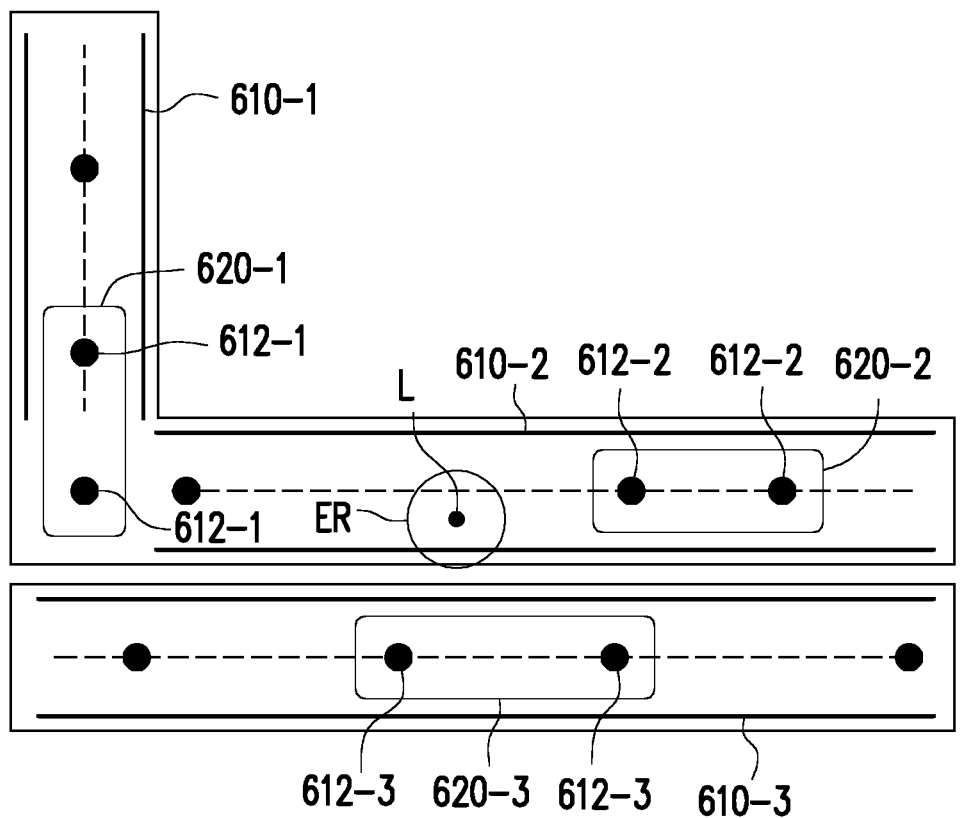
FIG. 6 is an example illustrating how to determine a matching reference object.

For example, FIG. 6 is an example illustrating how to determine a matching reference object. Referring to FIG. 6, it is assumed that a cartographic data type of a reference object is a road, and an initial message corresponds to a position L (with a possible positioning error range (ER)). Nodes 612-1, 612-2, and 612-3 are included in ranges of roads 610-1, 610-2, and 610-3, respectively. Among the nodes 612-1, 612-2, and 612-3 of the roads 610-1, 610-2, and 610-3, two nodes 612-1 closest to the location L will form a node group 620-1; two nodes 612-2 closest to the location L will form a node group 620-2; and two nodes 612-3 closest to the location L will form a node group 620-3.

In an embodiment, the processor 35 uses reference objects within a screening range corresponding to the location information as the matching reference objects. Referring to FIG. 5, the processor 35 may screen node groups by setting a screening range (step S550). That is, the node groups are used to compare whether they are within the screening range. The screening range is, for example, a range defined by a circle with a specific radius (such as 50, 100, or 500 meters) and with a circle center located at the location corresponding to the location information, or a range defined by a specific geometric shape centered at the location corresponding to the location information. For example, the processor 35 obtains the node groups that are less than 100 meters away from the location corresponding to the location information and that are among the foregoing node groups, and accordingly determines the matching reference objects.

Figure 7:
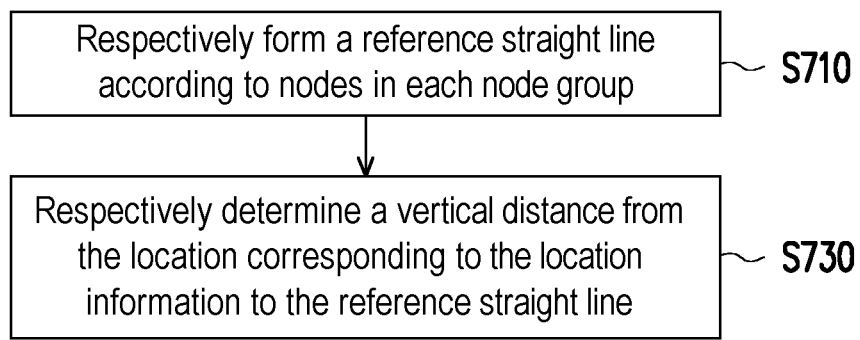
FIG. 7 is a flowchart of a method for determining a distance relationship in relation to a reference object according to an embodiment of the present disclosure.

Referring to FIG. 4, the processor 35 determines the identification information according to a distance relationship between the location information and the matching reference object (step S430). In an embodiment, the distance relationship includes a vertical distance between the reference object and the location corresponding to the location information. The processor 35 may determine the vertical distance between each matching reference object and the location corresponding to the location information respectively. FIG. 7 is a flowchart of a method for determining a distance relationship in relation to a reference object according to an embodiment of the present disclosure. Referring to FIG. 7, it is assumed that the representative location information of each reference object is determined by at least two nodes within a range of the reference object. The processor 35 may form a reference straight line according to at least two nodes in the matching reference objects respectively (step S710). That is, a connection line between at least two nodes in each reference object serves as a reference straight line.

Figure 8:
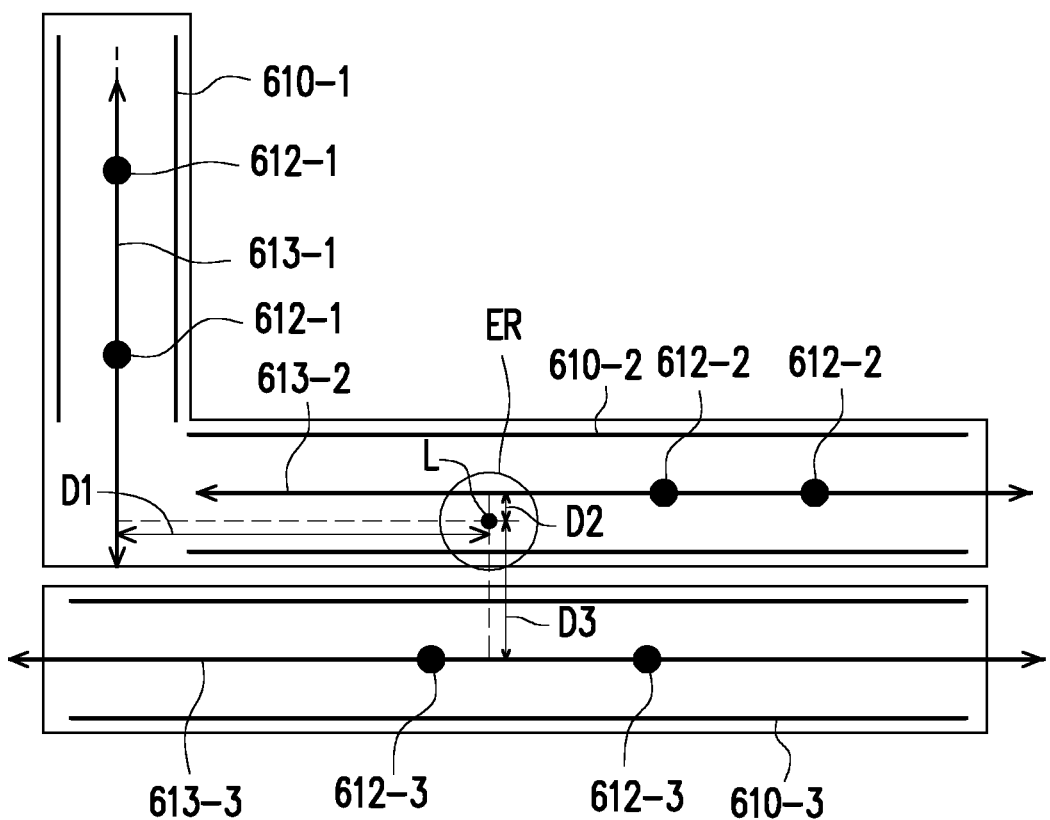
FIG. 8 is an example illustrating how to determine a vertical distance.

For example, FIG. 8 is an example illustrating how to determine a vertical distance. Referring to FIG. 8, double-arrowed lines in the figure represent the reference straight lines 613-1, 613-2, and 613-3 of the roads 610-1, 610-2, and 610-3 respectively. The reference straight line 613-1 is formed by connecting two nodes 612-1 in the node group 620-1, the reference straight line 613-2 is formed by connecting two nodes 612-2 in the node group 620-2, and the reference straight line 613-3 is formed by connecting two nodes 612-3 in the node group 620-3.

Referring to FIG. 7, the processor 35 may respectively determine the vertical distance from the location corresponding to the location information to each reference straight line (step S730). Specifically, a vertical distance represents a shortest distance from a point to a line or plane. Therefore, the vertical distance determines how close the location corresponding to the location information is to the reference object. For example, referring to FIG. 8, dashed lines in the figure represent the vertical distances D1, D2, D3 from the location L corresponding to the location information to the roads 610-1, 610-2, 610-3, respectively. The processor 35 may calculate the vertical distance from each location L to each straight line equation by using straight line equations formed by the reference straight lines 613-1, 613-2, and 613-3.

The processor 35 may select, among the matching reference objects, at least one reference object corresponding to the shortest vertical distance. The identification information corresponding to the location information is the identification information associated with the selected reference object. The processor 35 may select the identification information of the reference object corresponding to the shortest vertical distance, the second shortest vertical distance, or an otherwise ranked vertical distance as the identification information of the location information.

Figure 9:
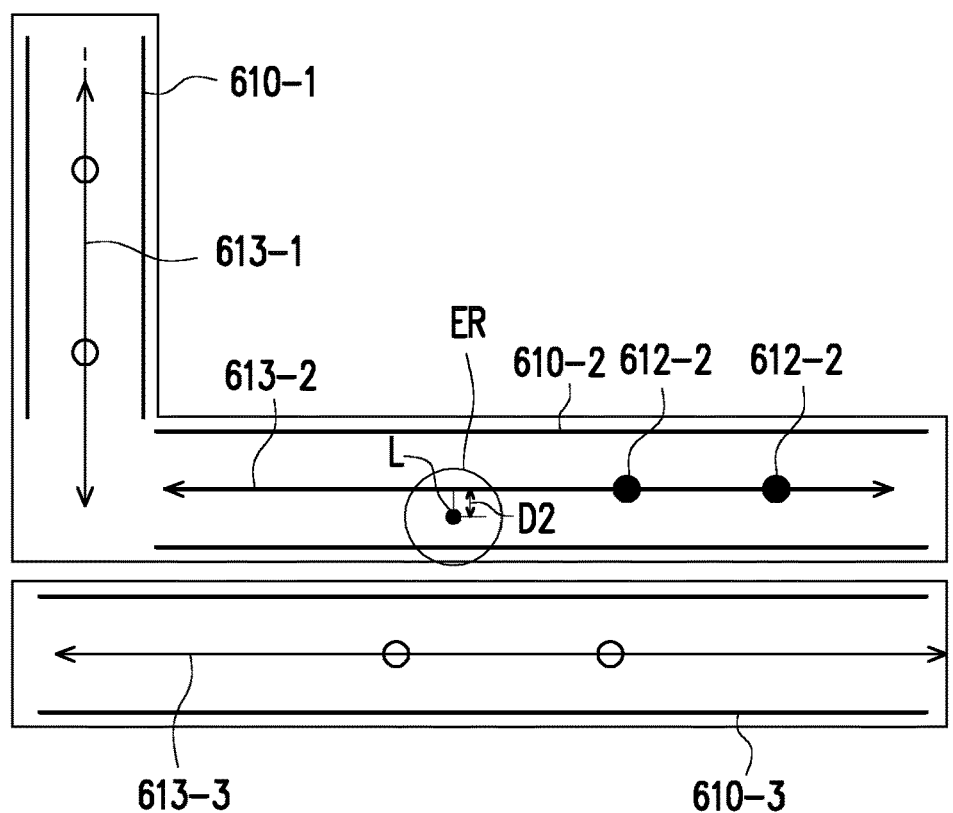
FIG. 9 is an example illustrating how to determine identification information.

For example, FIG. 9 is an example illustrating how to determine identification information. Referring to FIG. 9, the vertical distance D2 is the shortest, and the processor 35 selects the identification information of the road 610-2 corresponding to the vertical distance D2 as the identification information corresponding to the location information.

A node of each reference object is a part of the reference object to which the node belongs. The processor 35 may further determine whether the location corresponding to the location information is located within a covering range of the selected reference object (that is, at least one reference object corresponding to the shortest vertical distance), so as to confirm that the location corresponding to the location information belongs to a specific reference object. Depending on different cartographic data types, the covering range may represent a road width, a river width, a range of a construction site, a range of an administrative region, or the like. In this embodiment, the distance relationship further includes a relationship between the vertical distance and the covering range. The processor 35 may compare the vertical distance corresponding to the selected reference object with the covering range of the reference object, that is, check whether the location corresponding to the location information is within the covering range of the reference object. In a case that the location information is accompanied by a positioning error range, the vertical distance may be corrected before being compared with the covering range.

For example, referring to FIG. 9, shortest distances from the nodes 612-2 of the road 610-2 to a curb of the road are approximately equal (that is, half of the road width). The road width may be used as a covering range of the road 610-2, and the processor 35 may compare the shortest distance D2 with the road width of the road 610-2. In a case that the shortest distance D2 is less than the road width of the road 610-2, it indicates that the location corresponding to the location information is within the road 610-2. In a case that the shortest distance D2 is not less than the road width of the road 610-2, it indicates that the location corresponding to the location information is not within the road 610-2.

The processor 35 may determine the identification information of the location information according to a comparison result. The comparison result is that the vertical distance is within the covering range. That is, in a case that the comparison result is that the vertical distance is within the covering range, the processor 35 may use the identification information of the reference object corresponding to the vertical distance as the identification information of the location information. In a case that the comparison result is that the vertical distance is not within the covering range, the processor 35 does not use the identification information of the reference object corresponding to the vertical distance as the identification information of the location information. For example, the processor 35 uses a specific identifier different from that of the reference object as the identification information of the location information, or skips generating identification information of the location information.

In some embodiments, in a case that the vertical distances corresponding to more than two reference objects are less than the corresponding covering range, the processor 35 may use the identification information of all the reference objects as the identification information of location information, or selects the identification information of a reference object corresponding to the shortest vertical distance as the identification information of the location information. In addition, in other embodiments, the processor 35 may also directly calculate the vertical distances from the location corresponding to the location information to all reference objects without performing the preliminary screening shown in FIG. 5. Alternatively, the processor 35 may directly select at least one reference object, with a distance from a node of the reference object to the location corresponding to the location information being within the covering range.

Figure 10:
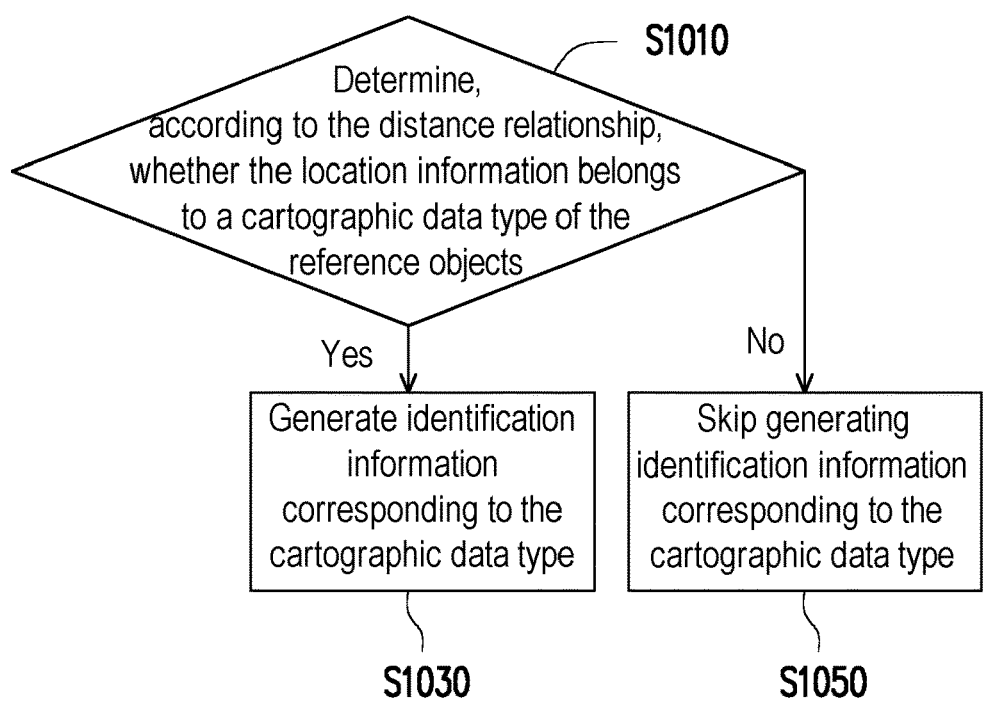
FIG. 10 is a flowchart of a method for generating identification information according to an embodiment of the present disclosure.

In an embodiment, FIG. 10 is a flowchart of a method for generating identification information according to an embodiment of the present disclosure. Referring to FIG. 10, the processor 35 may determine, according to the location relationship, whether the location information belongs to a cartographic data type to which the reference object belongs (step S1010), for example, whether the vertical distance from the location corresponding to the location information to the reference location is within the covering range (for example, in a case that the vertical distance is within the covering range, the location information belongs to the cartographic data type to which the reference object belongs; or, in a case that the vertical distance is not within the covering range, the location information does not belong to the cartographic data type to which the reference object belongs); or, whether the vertical distance is less than another specific value (for example, in a case that the vertical distance is less than a specific value, the location information belongs to the cartographic data type to which the reference object belongs; or, in a case that the vertical distance is not less than a specific value, the location information does not belong to the cartographic data type to which the reference object belongs). The processor 35 may screen out, according to the distance relationship, the reference objects belonging to a specific cartographic data type. The processor 35 may generate, in response to the location information belonging to the cartographic data type, identification information corresponding to the cartographic data type (step S1030). In FIG. 9, for example, the cartographic data type is a road. In a case that the location L corresponding to the location information is located on a road 610-2, the processor 35 may generate the identification information corresponding to the road 610-2, and use the identification information as the identification information of the location L. On the other hand, the processor 35 may skip, in response to the location information not belonging to the cartographic data type, generating identification information corresponding to the cartographic data type (step S1050). For example, the processor 35 uses a specific identifier (different from an identifier of any reference object of this cartographic data type) as an identifier of the location information, or directly skips generating no identification information.

In a case that the processor 35 selects a reference object of a specific cartographic data type, preliminary messages of the selected cartographic data type may be screened out according to the embodiment shown in FIG. 10, thereby excluding unnecessary preliminary messages. For example, in a case that the processor 35 selects a road, the processor 35 can determine whether the location corresponding to the location information is on the road, and accordingly exclude preliminary messages that are not on the road (for example, those inside a building). In some embodiments, the identification information may further include an indicator that is used to identify the cartographic data type. For example, an indicator of a road is A, and an indicator of a building is B.

Referring to FIG. 2, the processor 35 may generate a preprocessed message (step S250). Specifically, the preprocessed message includes the identification information determined above and the notification content in the initial message. In this embodiment of the present disclosure, the application service server 30 may serve as an edge computing platform, and convert the location information into a form of identification information by classifying the location information of the initial message as a specific reference object. The processor 35 transmits the preprocessed message through the communications transceiver 31. In this way, another apparatus (such as user equipment 70) may, according to the preprocessed message, provide identification information to avoid comparison of the location information, thereby reducing the amount of computing and improving efficiency of computing. In FIG. 3, for example, the identifier of 323764068 in the identification information 311 may be used to compare whether the identifier is the same as an identifier to be evaluated.

In some embodiments, the preprocessed message may further include the location information of the initial message or may include no other content than the notification content (that is, without belonging to any reference object).

Figure 11:
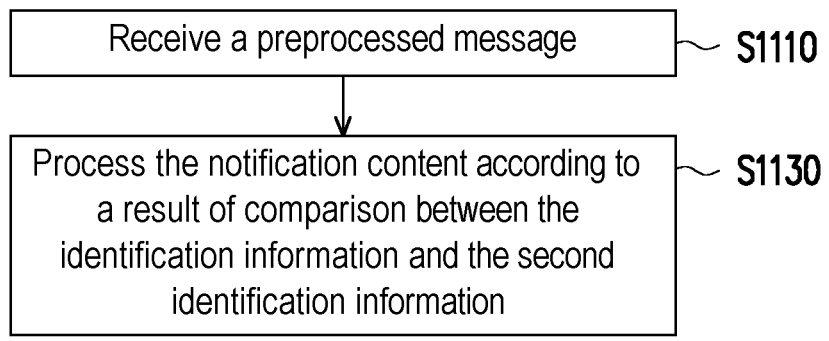
FIG. 11 is a flowchart of a region-based information processing method according to an embodiment of the present disclosure.

With respect to operations of the user equipment 70, FIG. 11 is a flowchart of a region-based information processing method according to an embodiment of the present disclosure. Referring to FIG. 11, the processor 75 receives a preprocessed message from the application service server 30 through the communications transceiver 71 (step S1110). Specifically, the application service server 30 may forward the preprocessed message to one or more relay stations 50 and/or one or more pieces of user equipment 70 through unicast or broadcast. Upon receiving the preprocessed message, the relay station 50 may further forward the preprocessed message to one or more pieces of user equipment 70 within a signal covering range thereof. As can be seen from the embodiment of the application service server 30 described above, the preprocessed message includes the identification information and notification content, and the identification information is provided by a geographic information service and used to represent location information defined by a geographic coordinate system.

The processor 75 may process the notification content according to a result of comparison between the identification information and the second identification information (step S1130). Specifically, the second identification information is provided by the geographic information service and used to represent a region of interest to the user equipment 70. For example, the format of the second identification information is the same as or similar to that of the identification information. Compared with the prior art in which the location information defined by the geographic coordinate system is compared, this embodiment of the present disclosure can improve computing efficiency by comparing the identification information. For example, the processor 75 may compare whether the identifier of the identification information is the same as the identifier of the second identification information, and generate a comparison result accordingly.

Figure 12:
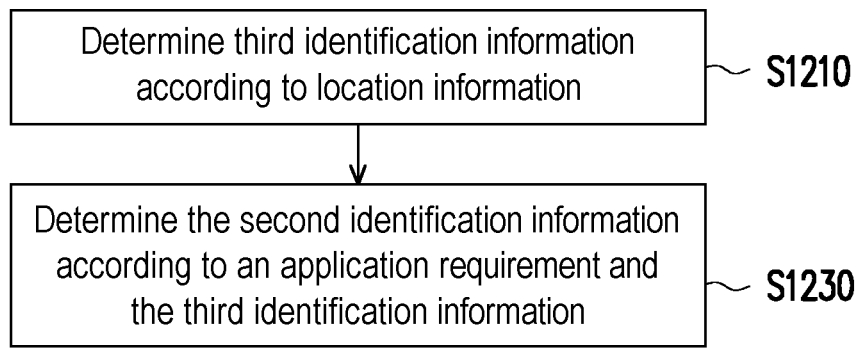
FIG. 12 is a flowchart of a method for determining identification information according to an embodiment of the present disclosure.

Further, the second identification information is associated with the location and application requirements (for example, navigation, collision prevention, traffic accident notification, or natural disaster emergency notification) of the user equipment 70. FIG. 12 is a flowchart of a method for determining identification information according to an embodiment of the present disclosure. Referring to FIG. 12, the processor 75 may obtain the location information of the user equipment 70 (that is, coordinates defined by a geographic coordinate system) through the positioning controller 77. The processor 75 may determine third identification information according to the location information of the user equipment 70 (step S1210). As regards how to determine the third identification information, reference may be made to the details of determining the identification information according to the location information in step S230 according to the embodiments shown in FIG. 2 to FIG. 10 (for example, determining a matching reference object, determining the identification information based on the distance relationship, determining belonging to a specific cartographic data type or not, determining the vertical distance and at least one corresponding to the shortest vertical distance, comparing the covering range, determining the vertical distance based on the reference straight line, screening the node groups based on a screening range, and loading map information), and the details are omitted here. That is, the third identification information replaces the identification information, and the location information of the user equipment 70 replaces the location information of the initial message. The third identification information is also location information provided by the geographic information service and used to represent the user equipment 70. In this way, the user equipment 70 may classify its own location information as a specific reference object.

As long as the location information of the user equipment 70 changes (for example, the user equipment moves), the third identification information may be updated. In addition, during the update process, the processor 75 may compare surrounding reference objects based on a movement status (such as direction or speed) of the user equipment 70 without re-comparing the identification information of all the reference objects.

Figure 13:
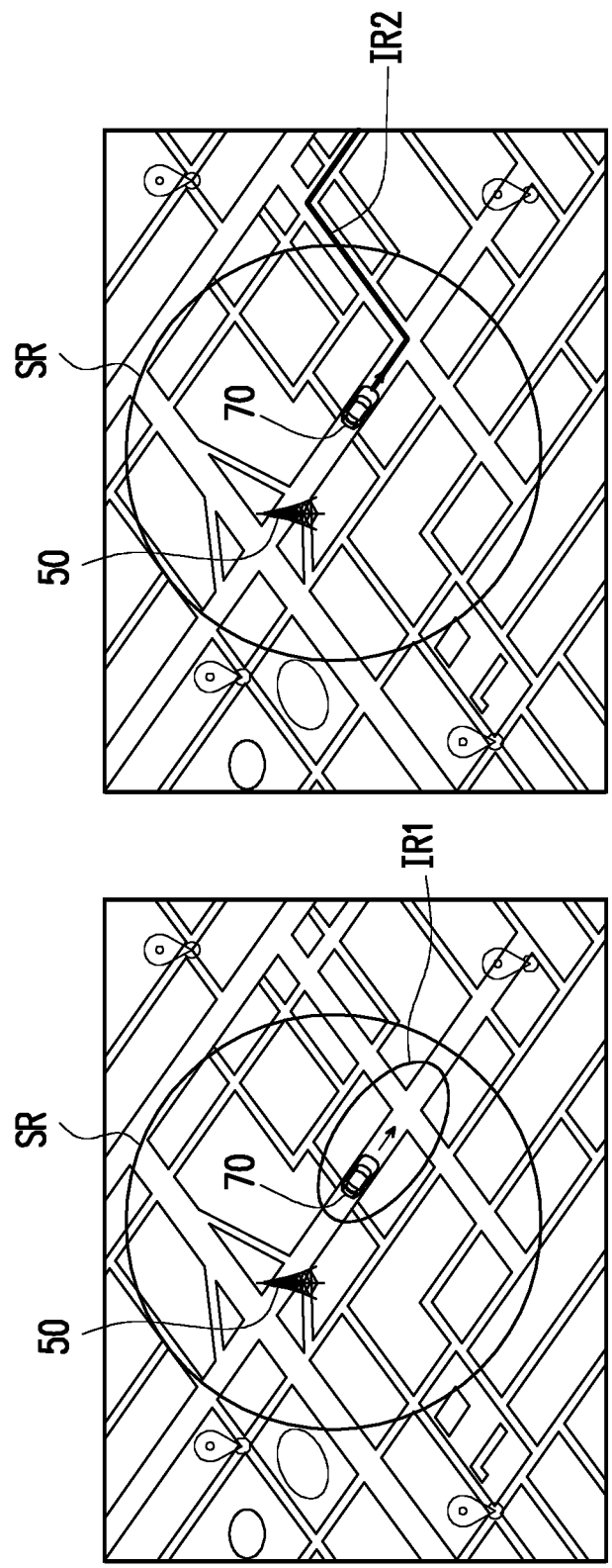
FIG. 13 is two examples illustrating a region of interest corresponding to an application requirement.

The processor 75 may determine the second identification information according to an application requirement and the third identification information (step S1230). Specifically, different application requirements may correspond to different regions of interest. For example, FIG. 13 shows two examples illustrating a region of interest corresponding to an application requirement. Referring to FIG. 13, the user equipment 70 is located within a signal covering range SR of the relay station 50, and can receive the preprocessed message accordingly. A left section of the figure shows application requirements pertinent to vehicle safety real-time status and traffic information, and a right section of the figure shows application requirements pertinent to route planning. Regions of interest IR1 and IR2 corresponding to the two application requirements are of different shapes.

The processor 75 may determine the corresponding fourth identification information based on the region of interest corresponding to the application requirement. As regards how to determine the fourth identification information, reference may be made to the details of determining the identification information according to the location information in step S230 according to the embodiments shown in FIG. 2 to FIG. 10, and the details are omitted here. That is, the fourth identification information replaces the identification information, and the location information of the region of interest (coordinates of a location of the covered region) replaces the location information of the initial message. The fourth identification information is also location information provided by the geographic information service and used to represent the region of interest. In this way, the user equipment 70 may classify the region of interest corresponding to its application requirement as a specific reference object.

The second identification information may be the third identification information, the fourth identification information, or a combination thereof. In some embodiments, the second identification information includes several pieces of sub-identification information (that is, the third identification information and/or the fourth identification information), and each piece of sub-identification information corresponds to the reference object defined by the geographic information service. That is, the second identification information may be a set of sub-identification information.

Figure 14:
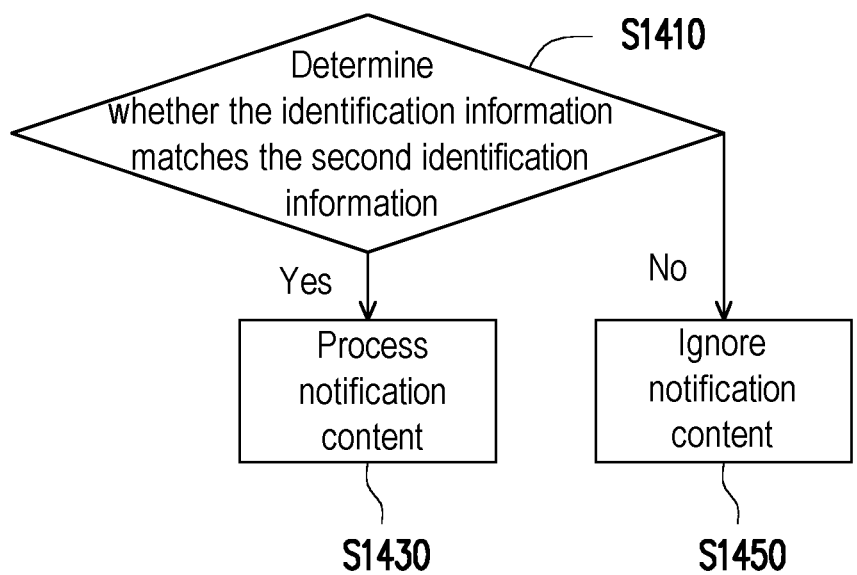
FIG. 14 is a flowchart of a method for processing notification content according to an embodiment of the present disclosure.

FIG. 14 is a flowchart of a method for processing notification content according to an embodiment of the present disclosure. Referring to FIG. 14, the processor 75 may determine whether the identification information matches the second identification information (step S1410), for example, whether the identifier or representative location information of the identification information is the same as the identifier or representative location information of the second identification information. In response to a comparison result that the identification information of the initial message matches the second identification information, the processor 75 processes the notification content (step S1430), for example, displays a warning message in notification content, determines a collision event, displays a traffic flow, or plans a navigation route. On the other hand, in response to the comparison result that the identification information does not match the second identification information, the processor 75 ignores the notification content (step S1450). For example, the processor 75 deletes the notification content/preprocessed message, stores the notification content/preprocessed message into the memory 73 or forwards the notification content/preprocessed message to another apparatus.

As can be seen, the user equipment 70 may determine validity of the notification content by comparing the identification information, and quickly screen out the notification content that meets its own application requirements. For example, for an application requirement pertinent to route planning or collision prevention prediction, the cartographic data type may be associated with the road, and the user equipment 70 can quickly exclude the messages that are outside the road.

In conclusion, in the application service server, the region-based information processing method, and the user equipment according to the embodiments of the present disclosure, the identification information of the specific reference object may replace the location information of the initial message, the user equipment, or the region of interest (that is, the geocoding format is converted). By simply comparing the identification information, the user equipment obtains a basis of determining whether to process the notification content. The application service server preliminarily converts the form of the location with respect to the initial message, and screens out the specific data type, thereby reducing the amount of computing of the user equipment, increasing efficiency of computing, and achieving a response speed that meets the application requirements.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Although the present disclosure has been described above with reference to the embodiments, the embodiments are not intended to limit the present disclosure. A person of ordinary skill in the art may make some modifications and improvements without departing from the spirit and scope of the present disclosure. Therefore, the protection scope of the present disclosure should be subject to the appended claims.

What is claimed is:

1. A region-based information processing method comprising:
receiving an initial message, wherein the initial message comprises a notification content corresponding to location information, and the location information is defined by a geographic coordinate system;
determining identification information according to the location information, wherein the identification information is provided by a geographic information service;
the identification information is a cartographic data attribute defined by the geographic information service, and the step of determining identification information further comprises:
providing multiple reference objects, wherein each of the reference objects has corresponding identification information;
determining, according to a distance relationship between the location information and at least one matching reference object, wherein the location information belongs to a cartographic data type of the reference objects; and
excluding the initial messages not belonging to the cartographic data type of the reference objects; and
generating a preprocessed message, wherein the preprocessed message comprises the identification information and the notification content.

2. The region-based information processing method according to claim 1, wherein the cartographic data attribute comprises an identifier and corresponding representative location information, the representative location information is associated with the geographic coordinate system, each of the reference objects further has a corresponding identifier and corresponding representative location information, and the step of determining the identification information according to the location information comprises:
determining the at least one matching reference object which matches the location information.

3. The region-based information processing method according to claim 2, wherein
in response to the location information belonging to the cartographic data type, the identification information corresponding to the cartographic data type is generated, and
in response to the location information not belonging to the cartographic data type, the identification information corresponding to the cartographic data type is not generated.

4. The region-based information processing method according to claim 2, wherein the distance relationship comprises a vertical distance, and the step of determining the identification information comprises:
respectively determining the vertical distance from each matching reference object to a location corresponding to the location information; and
selecting, among the at least one matching reference object, at least one reference object corresponding to a shortest vertical distance, wherein the identification information corresponding to the location information is associated with identification information of the selected at least one reference object.

5. The region-based information processing method according to claim 4, wherein the distance relationship further comprises a relationship between the vertical distance and a covering range, and the step of determining the identification information comprises:
comparing the vertical distance corresponding to the selected at least one reference object with the covering range; and
determining the identification information according to a comparison result, wherein the comparison result is that the vertical distance is within the covering range.

6. The region-based information processing method according to claim 4, wherein the representative location information of each reference object is determined by at least two nodes within a range of the reference object, and the step of respectively determining the vertical distance from each matching reference object to the location corresponding to the location information comprises:
respectively forming at least one reference straight line according to the at least two nodes in the at least one matching reference object, wherein each reference straight line passes through the corresponding at least two nodes; and
respectively determining the corresponding vertical distance from the location corresponding to the location information to the at least one reference straight line.

7. The region-based information processing method according to claim 3, wherein the cartographic data type of the reference objects is a road.

8. The region-based information processing method according to claim 2, wherein the step of determining the at least one reference object which matches the location information comprises:
using at least one reference object within a screening range corresponding to the location information as the at least one matching reference object.

9. The region-based information processing method according to claim 8, wherein at least two nodes are comprised in a range of each reference object, and before the step of using the at least one reference object within the screening range corresponding to the location information as the at least one matching reference object, the method further comprises:
respectively forming a node group according to at least two nodes in each reference object which are closest to a location corresponding to the location information, wherein each node group is used to compare the screening range.

10. The region-based information processing method according to claim 1, further comprising:
loading map information provided by the geographic information service, wherein the map information is associated with cartographic data attributes of multiple reference objects, each cartographic data attribute comprises second location information, and the second location information is defined by the geographic coordinate system; and respectively converting the second location information of the reference objects into corresponding representative location information, wherein each piece of the representative location information is in an index form.

11. An application service server comprising:
a communications transceiver configured to transmit or receive a signal; and
a processor coupled to the communications transceiver and configured to:
receive an initial message through the communications transceiver, wherein the initial message comprises a notification content corresponding to location information, and the location information is defined by a geographic coordinate system;
determine identification information according to the location information, wherein the identification information is provided by a geographic information service, the identification information is a cartographic data attribute defined by the geographic information service, and the processor is further configured to:
provide multiple reference objects, wherein each of the reference objects has corresponding identification information;
determine, according to a distance relationship between the location information and at least one matching reference object, wherein the location information belongs to a cartographic data type of the reference objects; and
exclude the initial messages not belonging to the cartographic data type of the reference objects; and
generate a preprocessed message, wherein the preprocessed message comprises the identification information and the notification content.

12. The application service server according to claim 11, wherein the cartographic data attribute comprises an identifier and corresponding representative location information, the representative location information is associated with the geographic coordinate system, each of the reference objects further has a corresponding identifier and corresponding representative location information, and the processor is configured to:
determine the at least one matching reference object which matches the location information.

13. The application service server according to claim 12, wherein
in response to the location information belonging to the cartographic data type, the processor generates the identification information corresponding to the cartographic data type, and
in response to the location information not belonging to the cartographic data type, the processor does not generate the identification information corresponding to the cartographic data type.

14. The application service server according to claim 12, wherein the distance relationship comprises a vertical distance, and the processor is configured to:
respectively determine the vertical distance from each matching reference object to a location corresponding to the location information; and
select, among the at least one matching reference object, at least one reference object corresponding to a shortest vertical distance, wherein the identification information corresponding to the location information is associated with identification information of the selected at least one reference object.

15. The application service server according to claim 14, wherein the distance relationship further comprises a relationship between the vertical distance and a covering range, and the processor is configured to:
compare the vertical distance corresponding to the selected at least one reference object with the covering range; and
determine the identification information according to a comparison result, wherein the comparison result is that the vertical distance is within the covering range.

16. The application service server according to claim 14, wherein the representative location information of each reference object is determined by at least two nodes within a range of the reference object, and the processor is configured to:
respectively form at least one reference straight line according to the at least two nodes in the at least one matching reference object, wherein each reference straight line passes through the corresponding at least two nodes; and
respectively determine the corresponding vertical distance from the location corresponding to the location information to the at least one reference straight line.

17. The application service server according to claim 13, wherein the cartographic data type of the reference objects is a road.

18. The application service server according to claim 12, wherein the processor is configured to:
use at least one reference object within a screening range corresponding to the location information as the at least one matching reference object.

19. The application service server according to claim 18, wherein at least two nodes are comprised in a range of each reference object, and the processor is configured to:
respectively form a node group according to at least two nodes in each reference object which are closest to a location corresponding to the location information, wherein each node group is used to compare the screening range.

20. The application service server according to claim 11, wherein the processor is configured to:
load map information provided by the geographic information service, wherein the map information is associated with cartographic data attributes of multiple reference objects, each cartographic data attribute comprises second location information, and the second location information is defined by the geographic coordinate system; and
respectively convert the second location information of the reference objects into corresponding representative location information, wherein each piece of the representative location information is in an index form.

21. The application service server according to claim 11, wherein the processor is configured to:
transmit the preprocessed message through the communications transceiver, wherein the preprocessed message is used to provide the identification information to replace comparison of the location information.

22. A user equipment comprising:
a communications transceiver configured to transmit or receive a signal; and
a processor coupled to the communications transceiver and configured to:

receive a preprocessed message through the communications transceiver, wherein the preprocessed message comprises identification information and a notification content, and the identification information is provided by a geographic information service and used to represent location information defined by a geographic coordinate system; and process the notification content according to a comparison result between the identification information and second identification information, wherein the second identification information is provided by the geographic information service and used to represent a region of interest to the user equipment, and the processor is further configured to:

provide multiple reference objects, wherein each of the reference objects has corresponding representative location information;

generate third identification information according to a cartographic data type of at least one matching reference object of the reference objects, wherein the at least one matching reference object matches location information of the user equipment;

determine the second identification information according to the third identification information; and exclude the notification content in response to the comparison result that the identification information does not match the second identification information.

23. The user equipment according to claim 22, wherein the processor is configured to:

process the notification content in response to the comparison result that the identification information matches the second identification information; and ignore the notification content in response to the comparison result that the identification information does not match the second identification information.

24. The user equipment according to claim 22, further comprising:

a positioning controller coupled to the processor and configured to obtain the location information of the user equipment, wherein the location information of the user equipment is defined by the geographic coordinate system, and the processor is configured to:

determine the third identification information according to the location information of the user equipment, wherein the third identification information is provided by the geographic information service and used to represent the location information of the user equipment; and determine the second identification information according to an application requirement and the third identification information.

25. The user equipment according to claim 22, wherein the second identification information comprises multiple pieces of sub-identification information, and each piece of the sub-identification information corresponds to a reference object defined by the geographic information service.

26. The user equipment according to claim 24, wherein the third identification information is a cartographic data attribute defined by the geographic information service, the cartographic data attribute comprises an identifier and corresponding representative location information, the representative location information is associated with the geographic coordinate system, each of the reference objects further has a corresponding identifier, and the operation of determining the identification information according to the location information comprises:

determining at least one reference object which matches the location information of the user equipment; and determining the third identification information according to a distance relationship between the location information of the user equipment and the at least one matching reference object.

27. The user equipment according to claim 26, wherein the processor is configured to:

determine, according to the distance relationship, whether the location information belongs to a cartographic data type of the reference objects, wherein in response to the location information belonging to the cartographic data type, the processor generates the third identification information corresponding to the cartographic data type, and in response to the location information not belonging to the cartographic data type, the processor does not generate the third identification information corresponding to the cartographic data type.

28. The user equipment according to claim 26, wherein the distance relationship comprises a vertical distance, and the processor is configured to:

respectively determine the vertical distance from each matching reference object to a location corresponding to the location information of the user equipment; and select, among the at least one matching reference object, at least one reference object corresponding to a shortest vertical distance, wherein the identification information corresponding to the location information is associated with identification information of the selected at least one reference object.

29. The user equipment according to claim 28, wherein the distance relationship further comprises a relationship between the vertical distance and a covering range, and the processor is configured to:

compare the vertical distance corresponding to the selected at least one reference object with the covering range; and determine the identification information according to a comparison result, wherein the comparison result is that the vertical distance is within the covering range.

30. The user equipment according to claim 28, wherein the representative location information of each reference object is determined by at least two nodes within a range of the reference object, and the processor is configured to:

respectively form at least one reference straight line according to the at least two nodes in the at least one matching reference object, wherein each reference straight line passes through the corresponding at least two nodes; and respectively determine the corresponding vertical distance from the location corresponding to the location information of the user equipment to the at least one reference straight line.

31. The user equipment according to claim 27, wherein the cartographic data type of the reference objects is a road.

32. The user equipment according to claim 26, wherein the processor is configured to:

use at least one reference object within a screening range corresponding to the location information as the at least one matching reference object.

33. The user equipment according to claim 32, wherein at least two nodes are comprised in a range of each reference object, and the processor is configured to:

respectively form a node group according to at least two nodes in each reference object which are closest to a location corresponding to the location information of the user equipment, wherein each node group is used to compare the screening range.

34. The user equipment according to claim 22, wherein the processor is configured to:
    load map information provided by the geographic information service, wherein the map information is associated with cartographic data attributes of multiple reference objects, each cartographic data attribute comprises second location information, and the second location information is defined by the geographic coordinate system; and
    respectively convert the second location information of the reference objects into corresponding representative location information, wherein each piece of the representative location information is in an index form.

* * * * *